(12) United States Patent (10) Patent No.: US 8,364,399 B2
Wendling et al. (45) Date of Patent: Jan. 29, 2013

(54) MANAGING THE CONFIGURATION OF A VEHICLE

(75) Inventors: Matthew Wendling, Covington, WA (US); Suresh Kumar, Bellevue, WA (US); Jake Tyler Ferderer, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 286 days.

(21) Appl. No.: 12/774,502

(22) Filed: May 5, 2010

(65) Prior Publication Data

US 2011/0276215 A1 Nov. 10, 2011

(51) Int. Cl.
 *G01C 21/00* (2006.01)
(52) U.S. Cl. .......................... 701/444; 701/400; 701/408
(58) Field of Classification Search .................. 701/444, 701/400, 408
 See application file for complete search history.

(56) References Cited

U.S. PATENT DOCUMENTS

| | | | |
|---|---|---|---|
| 5,247,440 | A | 9/1993 | Capurka |
| 6,715,778 | B2 | 4/2004 | Gottschalk |
| 7,415,771 | B2 | 8/2008 | Harrill |
| 7,467,473 | B2 | 12/2008 | Harrill |
| 7,548,805 | B2 * | 6/2009 | Yamaguchi et al. ............ 701/36 |
| 2005/0090956 | A1 | 4/2005 | Ogawa |
| 2007/0021886 | A1 | 1/2007 | Miyajima |
| 2009/0106990 | A1 | 4/2009 | Harrill |
| 2009/0187310 | A1 | 7/2009 | Ogawa |
| 2009/0261971 | A1* | 10/2009 | Viegers et al. ........... 340/539.22 |
| 2009/0322048 | A1 | 12/2009 | Glavinic |

FOREIGN PATENT DOCUMENTS

| | | |
|---|---|---|
| DE | 10 2004 012 136 A1 | 9/2005 |
| EP | 2 116 984 A1 | 11/2009 |
| GB | 2 390 438 A | 7/2004 |

OTHER PUBLICATIONS

International Search Report and Written Opinion mailed Jul. 27, 2011, issued in corresponding Application No. PCT/US2011/035418, filed May 5, 2011, 11 pages.

* cited by examiner

*Primary Examiner* — Hussein A. Elchanti
(74) *Attorney, Agent, or Firm* — Christensen O'Connor Johnson Kindness PLLC

(57) ABSTRACT

Generally described, aspects of the disclosed subject matter are directed to managing the configuration of a vehicle. In accordance with one embodiment, a method of modifying the configuration of a vehicle based on the vehicle's location is provided. The method includes receiving, from a remote Satellite Positioning System ("SPS") device, positioning data that identifies the location of the vehicle. Then, the positioning data is used to identify one or more regulations that are applicable, given the location of the vehicle. Based on collected vehicle readings, a determination is made regarding whether the configuration of the vehicle should be modified. In turn, the method may cause the configuration of the vehicle to be modified to comply with the one or more regulations.

18 Claims, 6 Drawing Sheets

MANAGING THE CONFIGURATION OF A VEHICLE

BACKGROUND

Increasingly, electronic components are being relied upon to facilitate the operation of a vehicle. These electronic components aid in the development of sophisticated vehicle subsystems such as collision detection, automated cruise control, global positioning navigation, and the like. In this regard, systems have been developed that allow electronic components in a vehicle to communicate in accordance with standard protocols. For example, a controller which may have been developed by an engine manufacturer may encapsulate and transmit data in accordance with a standard protocol. A cab-mounted vehicle controller developed by a different entity may receive and process the transmitted engine data. Since standard communication protocols exist, components made by different manufacturers are able to communicate. As a result of these and other advancements, an increasing amount of information generated by various vehicle systems may be monitored by a vehicle operator.

The increased availability of information allows a vehicle operator to more readily monitor vehicle conditions while driving. For example, tire pressure sensors may report readings that are presented on a dashboard display, thereby preventing a vehicle operator from having to manually check tire pressure. However, the increased availability of information can make operating the vehicle more complex and potentially distracting. In this regard, a vehicle operator may need to monitor multiple vehicle systems in order to ensure compliance with regulatory requirements (i.e., speed limits, weight restrictions, emission standards, lighting requirements, etc.). One deficiency of existing systems is the lack of automated assistance for configuring and operating a vehicle to ensure compliance with regulatory requirements that may vary depending on the vehicle's location.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, aspects of the disclosed subject matter are directed to managing the configuration of a vehicle. In accordance with one embodiment, a method of modifying the configuration of a vehicle based on the vehicle's location is provided. The method includes receiving, from a remote Satellite Positioning System ("SPS") device, positioning data that identifies the location of the vehicle. Then, the positioning data is used to identify one or more regulations that are applicable, given the location of the vehicle. Based on collected vehicle readings, a determination is made regarding whether the configuration of the vehicle should be modified. In turn, the method may cause the configuration of the vehicle to be modified to comply with the one or more regulations.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Embodiments of the disclosed subject matter will now be described with reference to the drawings where like numerals correspond to like elements. Embodiments of the present disclosure are generally directed to a vehicle configuration system suitable for use in vehicles, such as Class 8 trucks. Although exemplary embodiments of the disclosed subject matter may be described herein with reference to a truck, it will be appreciated that aspects of the disclosed subject matter have wide application, and therefore, may be suitable for use with many types of vehicles. Accordingly, the following descriptions and illustrations herein should be considered illustrative in nature, and thus, not limiting the claimed subject matter.

Prior to discussing the details of various aspects of the disclosed subject matter, it should be understood that the following description is presented largely in terms of logic and operations that may be performed by conventional electronic components. These electronic components, which may be grouped in a single location or distributed over a wide area, generally include processors, memory, storage devices, display devices, input devices (e.g., sensors), etc. It will be appreciated by one skilled in the art that the logic described herein may be implemented in a variety of configurations, including software, hardware, or combinations thereof. The hardware may include, but is not limited to, analog circuitry, digital circuitry, processing units, application specific integrated circuits (ASICs), and the like. In circumstances where the components are distributed, the components are accessible to each other via communication links.

Figure 1:
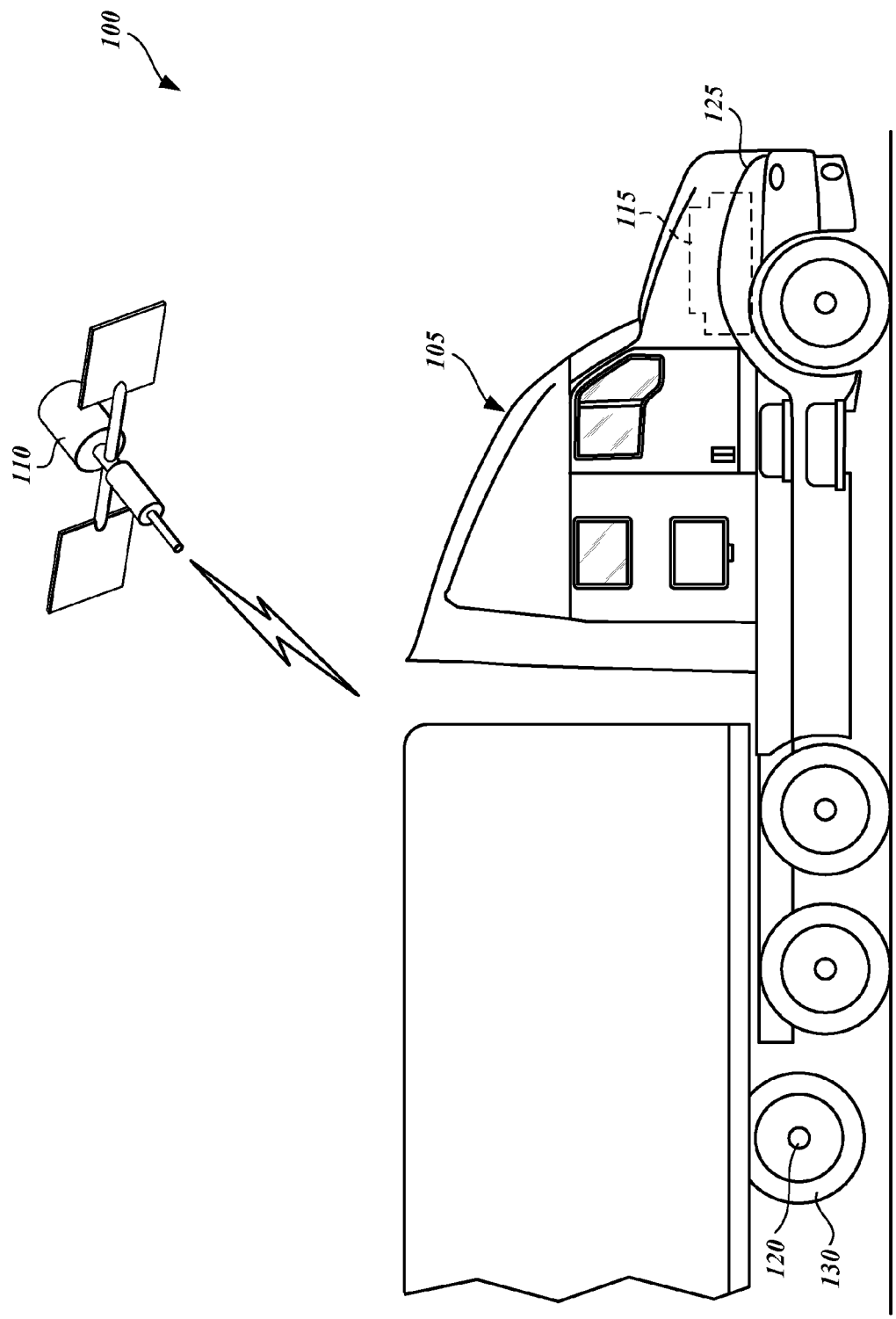
FIG. 1 is a block diagram depicting an exemplary environment where embodiments of the disclosed subject matter may be implemented.

Referring to FIG. 1, the following is intended to provide a general overview of an environment 100 in which aspects of the disclosed subject matter may be implemented. In this regard, the environment 100 depicted in FIG. 1 includes the truck 105 and the SPS satellites 110. In one embodiment, the configuration of the truck 105 is set and/or modified in order to comply with applicable regulatory requirements. In this regard, the SPS satellites 110 may periodically establish a communication link with the truck 105 and report location identifying information typically in terms of latitudinal and longitudinal coordinates. While various technologies may be used to identify the location and track the movement of the truck 105, preferably the reporting of location information uses a satellite positioning system ("SPS") such as the global positioning system ("GPS") or differential global positioning system ("DGPS"). In this regard, those of ordinary skill in the art and others will appreciate from the following description that the disclosed subject matter may utilize a variety of satellite and/or radio frequency location tracking systems (e.g., GPS, Galileo, DGPS, GLOSNASS, WAAS, OMEGA, LORAN, VOR, etc.). Collectively, such systems will be referred to herein as positioning systems, for ease of description. Regardless of the nature of the positioning system, the received location identifying information may be used to identify the applicable regulatory requirements given the location of the truck 105. As described in further detail below, aspects of the present disclosure may set and/or modify the configuration of the truck 105 in various ways to ensure compliance with regulatory requirements that may vary depending on the location of the truck 105.

As further illustrated in FIG. 1, the truck 105 includes a plurality of configurable components which, in this example, include the engine 115, lift axle 120, and headlamps 125. As known to those skilled in the art, the engine 115 provides power to affect movement of the truck 105. To distribute the vehicle load, the truck 105 includes a lift axle 120 coupled to the wheels 130 that may be deployed or retracted. When deployed, the wheels 130 are positioned to contact the road surface, further distributing the vehicle load. If retracted, the wheels 130 are not positioned to contact the road surface and the vehicle load is distributed over the remaining axles. Moreover, the truck 105 includes the headlamps 125 which provide external vehicle lighting when activated.

The truck 105 may include conventional operator control inputs (not illustrated), for obtaining input that affect various vehicle components including the engine 115, lift axle 120, and headlamps 125. These conventional operator control inputs may include, but are not limited to an accelerator pedal, shifting mechanism, brake pedal, dashboard, buttons, switches, knobs, etc. In one aspect, input received using these or other conventional operator controls may be adjusted to prevent a regulatory violation. To this end, location information reported by the SPS satellites 110 is used for automatically configuring the truck 105. When the location of the truck 105 is known, the applicable regulations (i.e., weight limit restrictions, speed limits, emission idling standards, lighting requirements, etc.) may be identified and the configuration of the vehicle components modified accordingly.

One of ordinary skill in the art will appreciate that the truck 105 will include many more components than those depicted in FIG. 1. However, it is not necessary that all of these generally conventional components be shown or described. Moreover, while FIG. 1 depicts a truck 105, another type of "vehicle" such as a car, boat, Recreational Vehicle ("RV"), vessel, etc., may be used to implement aspects of the present disclosure.

Figure 2:
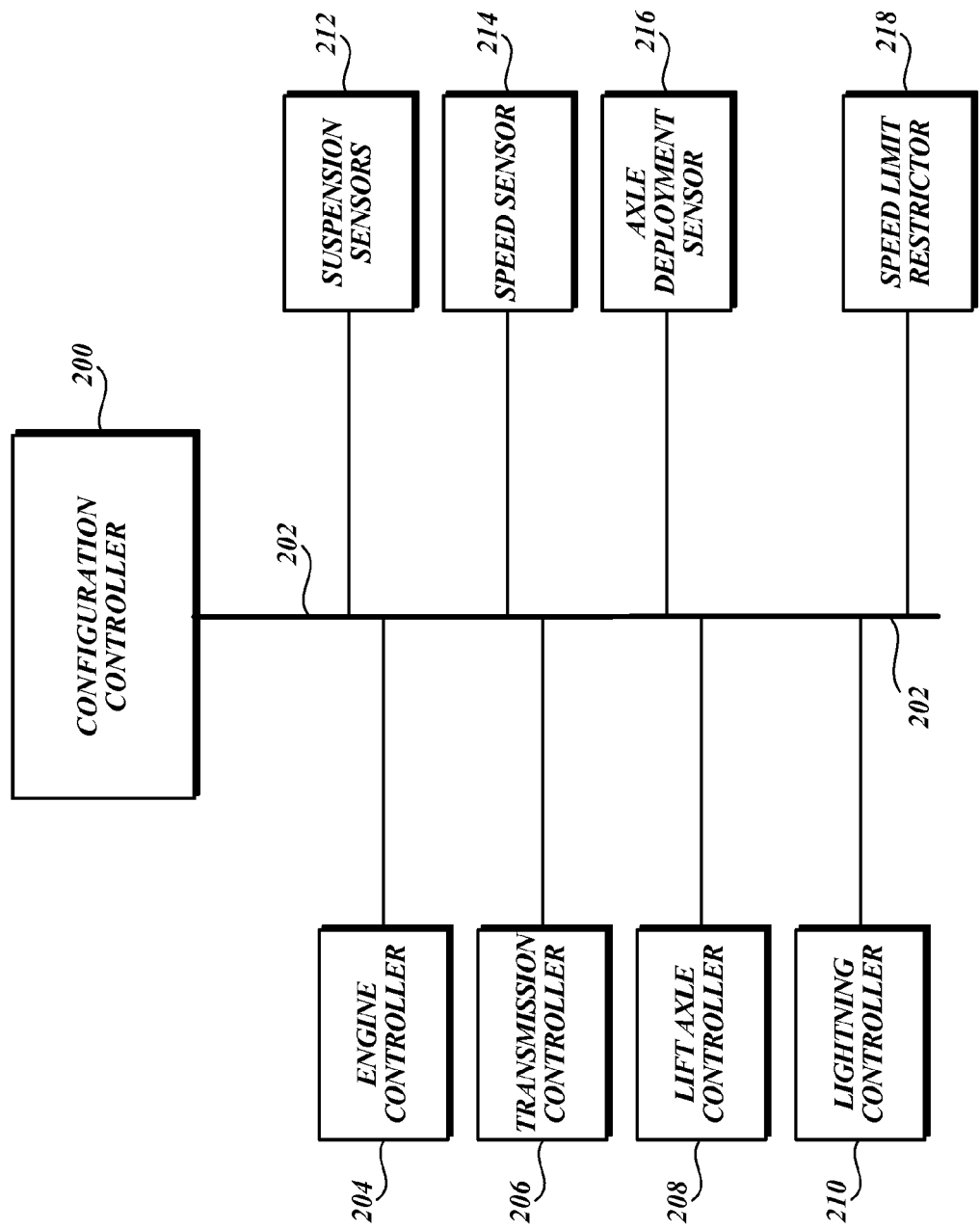
FIG. 2 is a general block diagram depicting the components of an exemplary configuration management system in accordance with one embodiment of the disclosed subject matter.

In one aspect, the present disclosure provides a configuration management system suitable for use in a vehicle such as truck 105 (FIG. 1). Generally described, the configuration management system monitors the operation and configuration of a vehicle to prevent violations of regulatory requirements. One suitable configuration management system will now be described. As best shown in FIG. 2, the configuration management system includes a configuration controller 200 that is communicatively connected to other vehicle controllers 204-210, the sensors 212-216, and the speed limit restrictor 218 via the vehicle-wide communication network 202. Those skilled in the art and others will recognize that the vehicle-wide communication network 202 may be implemented using any number of different communication protocols such as, but not limited to, Society of Automotive Engineers' ("SAE") J1587, SAE J1922, SAE J1939, SAE J1708, standards and combinations thereof. Alternatively, the aforementioned controllers 204-210 may be software control modules contained within one or more general-purpose controllers. It will be appreciated, however, that the disclosed subject matter is not limited to any particular type or configuration of controller, or to any specific control logic for governing operation of the vehicle.

The vehicle controllers depicted in FIG. 2 include various controllers such as the engine controller 204, transmission controller 206, lift axle controller 208, and lighting controller 210. Generally described, the engine controller 204 manages functions and operations of various aspects of the engine 115. For example, idling and emissions, fuel consumption, and engine speed may be monitored and managed by the engine controller 204. Similarly, the transmission controller 206 manages aspects of a transmission (not shown) such as transmission shifting. In this regard, the speed limit restrictor 218 may be in communication with the engine controller 204 and transmission controller 206. As described in further detail below, the speed limit restrictor 218 may be used to reduce the speed of the vehicle to prevent a regulatory violation. The lift axle controller 208 manages the deployment/retraction of the lift axle 120 (FIG. 1). Moreover, the lighting controller 210 manages the vehicle lighting such as the activation/deactivation of vehicle headlamps 125, interior lighting, exterior lighting, among others.

The exemplary sensors 212-216 depicted in FIG. 2 include the suspension sensors 212, the speed sensor 214, and the axle deployment sensor 216, etc. The suspension sensors 212 may include weight measurement sensors and load monitoring sensors (not shown) that generate signals indicative of the weight and position of the vehicle's cargo loads. The vehicle sensors 212-216 may be used individually or in conjunction with each other. For example, the suspension sensors 212 may be used in coordination with the axle deployment sensor 216 in determining whether a vehicle is in compliance with applicable weight regulations.

Figure 3:
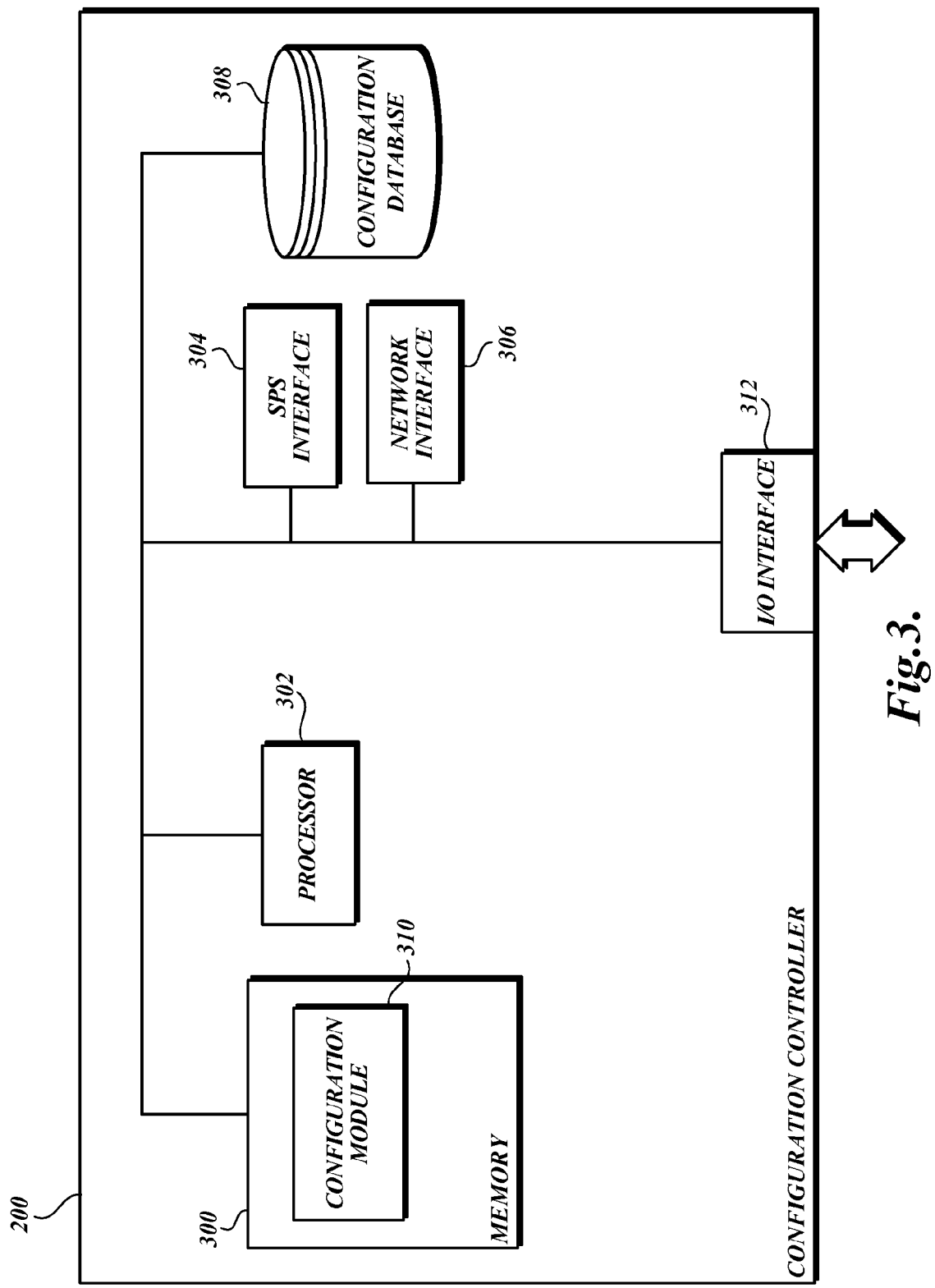
FIG. 3 is a general block diagram depicting the components of an exemplary controller in accordance with another embodiment of the disclosed subject matter.

With reference to FIG. 3, an exemplary component architecture of the configuration controller 200 will now be described. As best shown in FIG. 3, the controller 200 includes a memory 300 with a Random Access Memory ("RAM"), an Electronically Erasable, Programmable, Read-Only Memory ("EEPROM"), and any other suitable data storage means, a processor 302, the SPS interface 304, a network interface 306, a configuration database 308, and a configuration module 310 that includes logic for setting and/or modifying the configuration of a vehicle depending on the applicable regulatory requirements. By way of example only, the modifications to a vehicle's configuration performed by the configuration module 310 may include adaptive speed control, lift axle deployment/retraction, activating/deactivating vehicle lighting, adjusting the emission idle settings, just to name a few. In this regard, the processor 302 executes logic provided by the configuration module 310 in order to modify the configuration of the vehicle. To this end, the processor 302 and memory 300 are connected by an input/output (I/O) interface 312 for communicating with other vehicle devices, controllers, sensors, and the like.

As used herein, control units, control modules, program modules, etc., can contain logic for carrying out general or specific operational features. The logic can be implemented in hardware components, such as analog circuitry, digital circuitry, processing units, and combinations thereof, or software components having instructions which can be processed by the processing units, etc. Therefore, as used herein, the term "controller" can be used to generally describe these aforementioned components, and can be either hardware or software, or combinations thereof, that implement logic for carrying out various aspects of the present disclosure.

The SPS interface 304 is a component of the configuration controller 200 that is operative to receive and record SPS signals. More specifically, the SPS interface 304 includes an SPS communication circuitry that receives signals from SPS satellites 110, pseudolites, or related devices and uses the signals to determine the location of the SPS communication circuitry and, thus, the vehicle (i.e., the truck 105) that incorporates the configuration controller 200. The term SPS is a generic reference to any satellite-pseudolite-based location determining system. In addition to performing SPS tracking, which utilizes SPS signals in order to determine a location, some exemplary systems may also use radio frequency identification ("RFID") signals as an additional aid in determining the vehicle's location.

The configuration controller 200 may further include a network interface 306 for communicating with other devices or networks using IP-based communication protocols. The network interface 306 may include communication circuitry that permits communication over one or more of the wireless networks such as those using CDMA, GSM, IEEE 802.11 and IEEE 802.16, UMTS, WIMAX, etc. As described in further detail below, the network interface 306 may be used to obtain route data, regulation data, and component configuration data that is used in setting and/or modifying the configuration of the vehicle.

Figure 4:
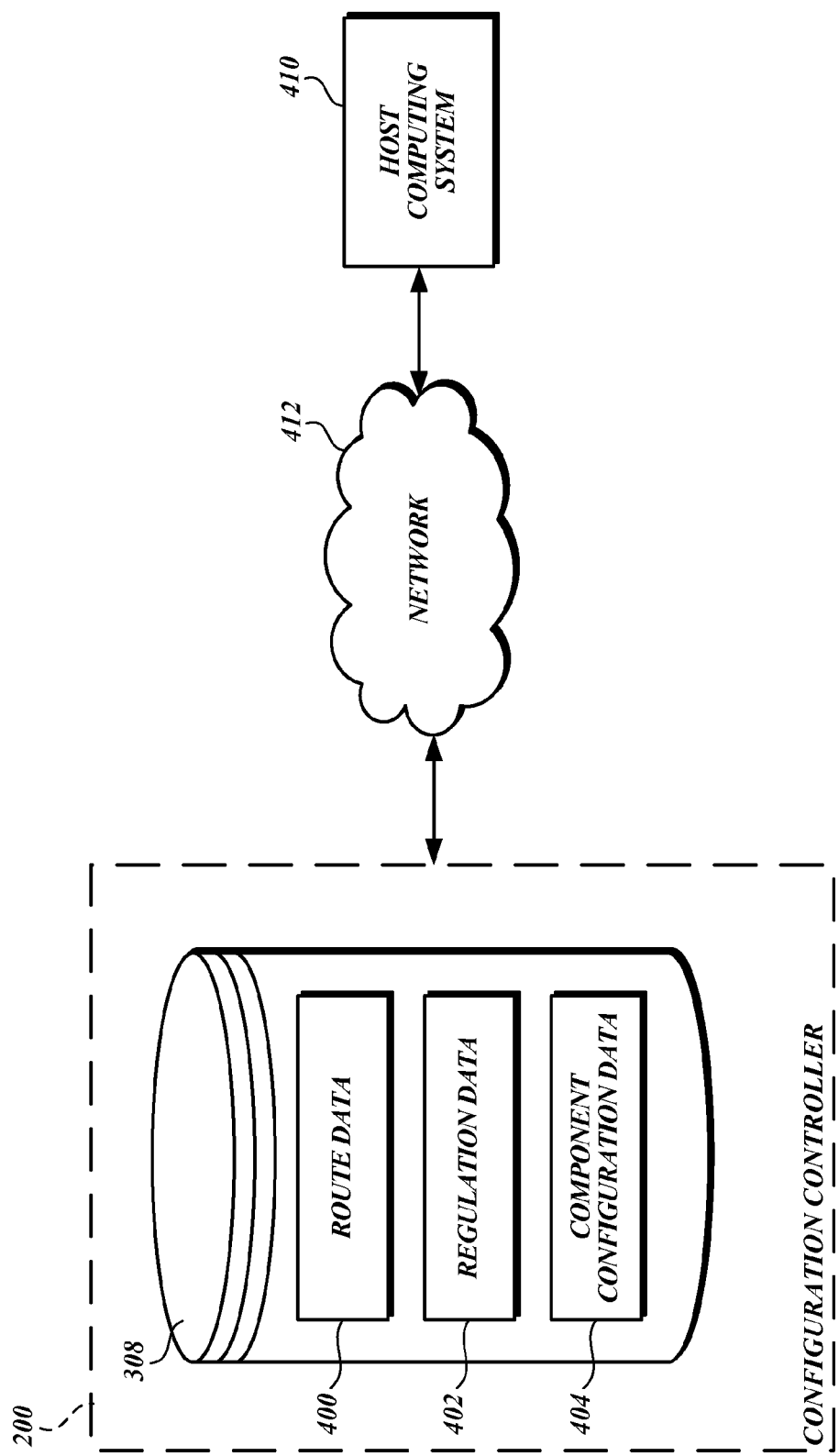
FIG. 4 is a block diagram depicting a configuration database that stores different types of data for setting the configuration of a vehicle in accordance with another embodiment of the disclosed subject matter.

As briefly mentioned above, the configuration controller 200 may include a configuration database 308 that stores data relevant to setting the configuration of a vehicle. Now, with reference to FIG. 4, additional aspects of the configuration database 308 will be described. As illustrated in FIG. 4, the configuration database 308 stores different types of data that are relevant to setting and/or modifying the configuration of the vehicle including the route data 400, regulation data 402, and component configuration data 404. The route data 400 may include, but is not limited to, information regarding road locations, directions, turn restrictions, and corresponding speed limits, etc. With the vehicle's location and the route data 402, aspects of the present disclosure are able to identify a road that the vehicle is traveling and the corresponding speed limits.

The regulation data 402 maintained in the configuration database 308 may include sets of regulations imposed by particular jurisdictions. This information may include, but is not limited to, weight limit restrictions, height limits, emission idle standards, lighting regulations, among others. The regulation data 402 may be layered so that all regulations applicable to operating a vehicle at a particular location can be identified. Accordingly, the regulation data 402 may include information that describes regulations imposed by a national jurisdiction at one layer as well as local jurisdictions (i.e., state, county, city, etc.) at other layers.

The component configuration data 404 includes information that describes the proper configuration of various vehicle components, given certain variables. For example, the component configuration data 404 may indicate that the lift axle 120 should be deployed, given certain vehicle attributes (type of vehicle, number of axles, cargo type, etc.), the current vehicle weight, applicable weight regulations, among others. By way of other examples, the appropriate configuration of the vehicle's lights (i.e., headlamps, trailer lights, cab lights, etc.), emission idle settings, etc., given the appropriate variables, are defined in the component configuration data 406. While specific examples have been described, those skilled in the art and others will recognize that the configuration database 308 may maintain other types of data without departing from the scope of the claimed subject matter.

In one embodiment, the configuration controller 200 interfaces with a host computing system 410 to obtain current data for storage locally in the configuration database 308. In this regard, data that is relevant to setting and/or modifying the configuration of a vehicle across jurisdictions may be maintained at the host computing system 410. The SPS interface 304 or the network interface 306 may be used to communicate over the network 412 with the host computing system 410. In this regard, the network 412 may utilize IP-based protocols and be implemented as a local area network ("LAN"), wireless network, wide area network ("WAN"), such as the Internet, and combinations thereof. However, since IP-based protocols for network communication are well known to those skilled in the art, those protocols will not be described here. In any event, current data used for setting and/or modifying the configuration of a vehicle may be maintained at the host computing system 410. As illustrated in FIG. 4, this data may be delivered to the configuration controller 200 and stored in the configuration database 308.

As indicated above, the configuration controller 200 executes application logic embodied in the configuration module 310 to ensure that a vehicle is in compliance with regulations that may vary between locations. Now, with reference to FIG. 5, a configuration method 500 for setting and/or modifying the configuration of a vehicle to comply with applicable regulations will be described. As a preliminary matter, those skilled in the art will appreciate that a typical controller 200 is frequently designed to operate in a continual manner, i.e., once initialized and operating, the configuration controller 200 continually monitors the location and configuration of the vehicle. Accordingly, while the configuration method 500 depicted in FIG. 5 includes a begin and end terminal, the method 500 operates continually, presumably until the configuration controller 200 is powered down.

Figure 5:
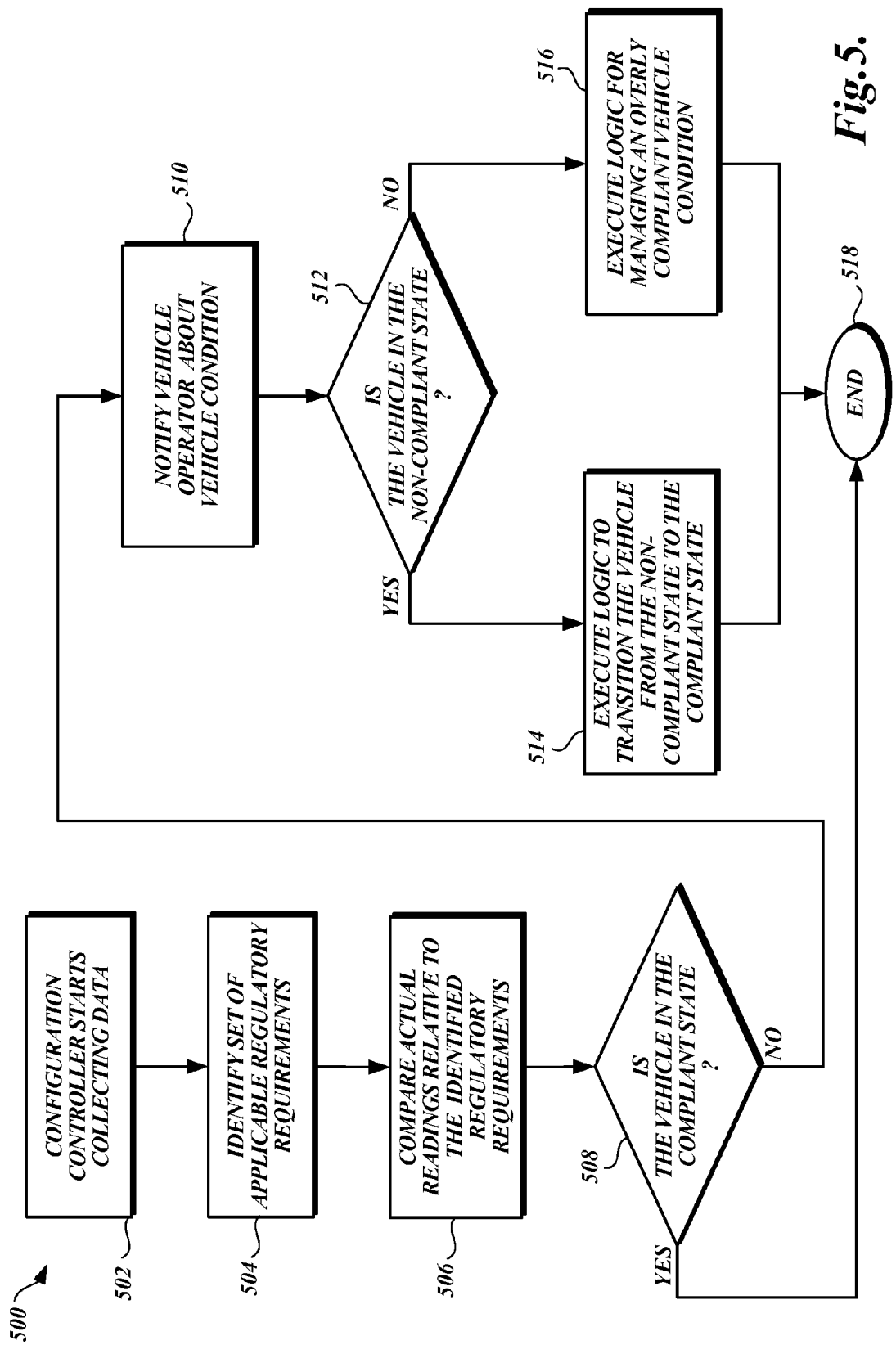
FIG. 5 is a flow diagram of a configuration method that modifies the configuration of the vehicle in accordance with additional embodiments of the disclosed subject matter.

As illustrated in FIG. 5, the configuration method 500 begins at block 502 where the configuration controller 200 starts collecting data that is relevant in setting and/or modifying the configuration of a vehicle. The data collected by the configuration controller 200 may be generated and transmitted from one or more remote controllers, sensors, and other devices. As mentioned briefly above, data collection may be initiated at vehicle startup and occur continually during operation of the vehicle. This data may be reported from a number of vehicle systems and transmitted to the configuration controller 200, as discussed above with reference to FIG. 2. Data collected by the configuration controller 200 may include, but is not limited to, vehicle speed, weight and load information, lighting configuration, lift axle deployment/retraction information, idle emission settings, and the like. Moreover, the collection of position data generated by one or more remote devices, such as the SPS satellites 110, may also be initiated at block 502. As described in further detail below, data collected by the configuration controller 200 may be processed and used to set and/or modify the vehicle configuration in various ways.

At block 504 of the configuration method 500, a set of regulatory requirements that apply, given the vehicle's current location, are identified. While in transit, a vehicle may cross national borders, state lines, and the like. Each of these jurisdictions may impose different regulatory requirements. In addition, speed limits vary depending on the location of a vehicle on a particular roadway. Using the vehicle's location, a set of applicable regulations (i.e., weight limits, speed limits, emission idling standards, lighting requirements, etc.) are identified. In particular, location data reported by the SPS satellites 110 may be used in performing a database lookup (in the configuration database 308) to identify a set of regulations that are applicable given the location of the vehicle. In this regard, the data maintained in the configuration database 308 is accessed to identify the set of applicable regulations, at block 504.

At block 506 of the configuration method 500, a comparison is performed between actual vehicle readings collected by the configuration controller 200 relative to the applicable set of regulatory requirements. By performing this comparison, the compliance state of the vehicle with regard to regulations that may vary depending on a vehicle's location is tracked. In this regard, the identified compliance state is used to determine whether corrective action should be taken to modify the configuration of the vehicle and ensure that a regulation is not violated.

Figure 6:
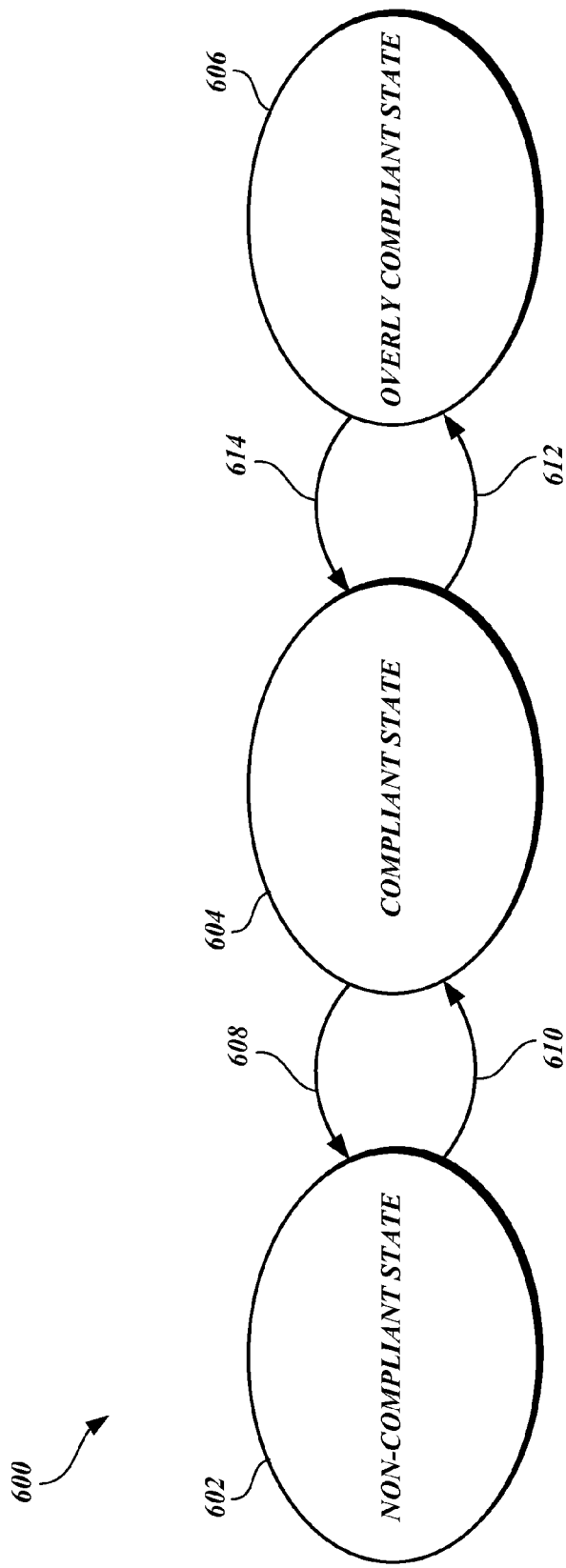
FIG. 6 is a general block diagram depicting a configuration state machine suitable for illustrating additional aspects of the disclosed subject matter.

Now, with reference to FIG. 6, an exemplary compliance state machine 600 for tracking the state of a vehicle based on actual vehicle readings will be described. As illustrated in FIG. 6, the compliance state machine 600 may be in one of three potential states including the non-compliant state 602, the compliant state 604, and the overly compliant state 606. The various states 602-606 of the vehicle as represented in the compliance state machine 600 can apply to individual readings as well as to the overall compliance state of the vehicle.

By comparing actual readings relative to a set of applicable regulations, a determination may be made that the vehicle is in the non-compliant state 602. The following description provides exemplary scenarios in which the vehicle may be identified as being in the non-compliant state 602 by aspects of the present disclosure. In one embodiment, received positioning data is used to determine whether the vehicle is located in or about to enter a new jurisdiction that imposes different weight restrictions than a previous jurisdiction. If the vehicle weight is such that a regulation in a new jurisdiction will be violated, then the vehicle transitions 608 to the non-compliant state 602. Upon transitioning to the non-compliant state 602, in this example, a determination is made regarding whether the lift axle 120 (FIG. 1) should be deployed in order to transition 610 the vehicle to the compliant state 604.

Generally described, a transition to the non-compliant state 602 may occur whenever the configuration of the vehicle should be modified to comply with a particular regulation. For example, certain jurisdictions (i.e., Canada) impose daytime headlamp restrictions where headlamps must be activated while operating the truck 105. Similar to the description provided above, if the vehicle headlamps are not activated and a determination is made (based on received positioning data) that corrective action is needed to prevent a violation, then the vehicle will transition 608 to the non-compliant state 602. By way of additional examples, if the vehicle state is below the designated speed limit, the vehicle's speed is identified as being in the compliant state 604. In instances when the vehicle operator attempts to surpass the designated speed limit, the vehicle transitions 608 to the non-compliant state 602.

In another embodiment, an engine's emission idle settings may need to change in order to comply with a local regulation. In this regard, certain jurisdictions (i.e., California) impose more stringent idle emission standards than other jurisdictions. Positioning data reported by the SPS satellites 110 may be used to determine whether the vehicle is located in or about to enter this type of jurisdiction. If the emission standards in a new jurisdiction will be violated, the vehicle may transition 608 to the non-compliant state 602 so that corrective action may be taken, as described in further detail below. On the other hand, upon leaving a jurisdiction that imposes more stringent idle emission standards, the vehicle may transition 612 to the overly compliant state 606. In this instance and as described in further detail below, action may be taken to transition 614 the vehicle from the overly compliant state 606 to the compliant state 604.

With reference again to FIG. 5, the configuration method 500 determines whether the vehicle is in the compliant state at decision block 508. As described above with reference to FIG. 6, a vehicle may be in one of potentially three states including the non-compliant state 602, the compliant state 604, or the overly compliant state 606. In instances when the vehicle is identified as being in the compliant state 604, the result of the test performed at block 508 is "YES." In this instance, the configuration method 500 proceeds to block 518, where it terminates. If the vehicle is either in the non-compliant state 602 or the overly compliant state 606, the result of the test performed at block 508 is "NO," and the configuration method 500 proceeds to block 510, described in further detail below.

At block 510 of the configuration method 500, the vehicle operator is notified about a condition that caused the vehicle to transition to either the non-compliant state 602 or the overly compliant state 606. Notifying the vehicle operator is an optional step that may not be performed in all instances. However, the vehicle operator will typically be notified and specifically informed regarding the condition that caused the vehicle to transition to the non-compliant state 602 or the overly compliant state 606. In this regard, the vehicle operator may be notified through a dialogue that is presented on a dashboard display. However, other visual, auditory, or haptic feedback may be provided to notify the vehicle operator. In one embodiment, the vehicle operator may be given the opportunity to rectify the non-compliant or overly compliant condition before modifications are made automatically. In addition or alternatively, the vehicle operator may be allocated the authority to prevent aspects of the present disclosure from automatically modifying the configuration of the vehicle. In any event, it should be well understood that notifying the vehicle operator, at block 510, is an optional step that may not be performed in all instances.

At decision block 512 of the configuration method 500, a determination is made regarding whether the vehicle is in the non-compliant state 602. If block 512 is reached, the vehicle is either in the non-compliant state 602 or the overly compliant state 606 as described above. In instances when the vehicle is in the overly compliant state 606, the result of the test performed at block 512 is "NO," and the configuration method 500 proceeds to block 516, described in further detail below. On the other hand, if the vehicle is in the non-compliant state 602, the result of the test performed at block 512 is "YES," and the configuration method 500 proceeds to block 514.

At block 514 of the configuration method 500, logic for transitioning a vehicle from the non-compliant state 602 to the compliant state 604 is executed. If block 514 is reached, the vehicle is in the non-compliant state 602, as described above. In this instance, the logic that is executed at block 514 may involve modifying the configuration of the vehicle in a number of different ways, as described in further detail below.

Now, with reference again to FIG. 6, exemplary modifications to a vehicle's configuration that may be implemented at block 514 to transition the vehicle from the non-compliant state 602 to the compliant state 604 will be described. In one embodiment, a vehicle lift axle 120 is automatically deployed in order to comply with weight regulations associated with a particular jurisdiction, roadway, etc. For example, a determination may be made (at block 506 described above) that a vehicle has or will enter a jurisdiction with different weight limit restrictions than a previous jurisdiction. In this instance, logic is executed to determine whether the lift axle 120 should be deployed given the new weight limit restrictions. As described above, the configuration controller 200 receives location identifying information of a vehicle from a positioning system. A lookup may be performed in the configuration database 308 to determine whether the lift axle 120 should be deployed in order to comply with the new weight limit restrictions. In instances when the lift axle 120 should be deployed, the configuration controller 200 transmits a message to the lift axle controller 208, at block 514, for the purpose of deploying the lift axle 120 and therefore modifying the configuration of the vehicle to prevent a regulatory violation.

In another embodiment, the speed limit restrictor 218, or other substantially similar component is employed to limit the speed of a vehicle. In this regard, the route data 400 maintained in the configuration database 308 may be used to determine the speed limit that applies, given the location of the vehicle. This data may be compared to the actual vehicle speed collected by the configuration controller 200 to determine whether the vehicle operator is attempting to surpass the designated speed limit. To transition the vehicle to the compliant state 602 in this instance, the configuration controller 200 may transmit one or more messages to the speed limit restrictor 218 to prevent the speed limit from being exceeded.

In order to transition the vehicle from the non-compliant state 602 to the compliant state 604, at block 514, other types of logic may be executed. For example, a determination may be made (at block 506 described above) that a vehicle's headlamps should be activated or emission idle settings modified in order to comply with an applicable regulation. In this instance, the logic executed at block 514 causes the headlamps 125 to be activated and/or emission settings of the engine 115 to change. To modify the configuration of the vehicle in this way, one or more messages may be transmitted from the configuration controller 200 to the engine controller 204 and/or lighting controller 210, as appropriate.

With reference again to FIG. 5, at block 516 of the configuration method 500, logic for managing one or more overly compliant vehicle conditions is executed. If block 516 is reached, a vehicle was identified as being in the overly compliant state 606. In this instance, logic may be executed for transitioning the vehicle from an overly compliant state 606 to the compliant state 604. For example, certain jurisdictions may impose more stringent weight and/or emission idling standards than others. Upon leaving this type of jurisdiction, a vehicle may be in the overly compliant state 606. In this instance, logic may be executed to transition the vehicle from the overly compliant state 606 to the compliant state 604. The logic that is executed, at block 516, may involve modifying the same vehicle components in ways that are converse to the description provided above with reference to block 514. In an alternative embodiment, user input and/or system settings define how an overly compliant vehicle condition is handled at block 516. In this regard, a vehicle operator may be prompted, when the vehicle is identified as being in the overly compliant state 606, to provide input regarding the corrective action, if any, to implement. In addition or alternatively, a fleet operator or other entity may establish settings which provide logic for handling one or more overly compliant vehicle conditions. Then, once the logic for handling either a non-compliant vehicle condition (at block 514) or an overly compliant vehicle condition (at block 516) is executed, the configuration method 500 proceeds to block 518, where it terminates.

While illustrative embodiments have been illustrated and described, it will be appreciated that various changes can be made therein without departing from the spirit and scope of the claimed subject matter.

The invention claimed is:

1. A method implemented in computer-executable instructions of managing the configuration of a vehicle based on positioning data, the method comprising:
    receiving, from a remote SPS device, positioning data that identifies a location of the vehicle;
    identifying one or more regulations that are applicable based on the location of the vehicle, wherein the one or more regulations vary between different locations, and wherein the one or more regulations are associated with regulation data;
    collecting actual vehicle readings;
    comparing the actual vehicle readings to the regulation data to determine whether the configuration of the vehicle should be modified to comply with the one or more regulations; and
    if a determination is made to modify the configuration of the vehicle, transmitting a message to a corresponding vehicle controller to implement the modification.

2. The method as recited in claim 1, wherein identifying one or more regulations that are applicable, given the location of the vehicle, includes assessing data that describes the one or more regulations from a remote network location.

3. The method as recited in claim 1, wherein determining whether the configuration of the vehicle should be modified to comply with the one or more regulations includes:
    identifying a vehicle weight from the actual vehicle readings;
    comparing the vehicle weight to the applicable weight regulation; and
    if the vehicle weight is over the limit defined in the weight regulation, causing the lift axle to be deployed.

4. The method as recited in claim 1, wherein determining whether the configuration of the vehicle should be modified to comply with the one or more regulations includes:
    identifying a vehicle speed from the actual vehicle readings;
    comparing the vehicle speed to the applicable speed limit; and
    if the vehicle speed is over the speed limit, causing a speed limit restrictor to reduce the speed of the vehicle.

5. The method as recited in claim 1, wherein determining whether the configuration of the vehicle should be modified to comply with the one or more regulations includes:
    determining whether the vehicle's location corresponds to a new jurisdiction with more stringent idle emission regulations than a previous jurisdiction; and
    if the idle emission regulations of the new jurisdiction is more stringent, modifying the emission settings of the engine to comply with the regulations.

6. The method as recited in claim 1, wherein determining whether the configuration of the vehicle should be modified to comply with the one or more regulations includes:
    determining whether the vehicle's location corresponds to a jurisdiction that has a regulation requiring that the vehicle's headlamps be activated; and
    if the jurisdiction has a regulation that the vehicle's headlamps be activated, causing a lighting controller to activate the vehicle's headlamps.

7. The method as recited in claim 1, wherein transmitting a message to a corresponding vehicle controller to implement the modification includes performing a database lookup to identify a modification to the vehicle's configuration needed to comply with the regulation.

8. An apparatus operative to modify the configuration of a vehicle based on positioning data, comprising:
one or more processors;
an SPS interface operative to receive location identifying information from a positioning system;
a computer-readable media having computer-executable instructions that, when executed by the one or more processors, causes the apparatus to:
store a set of regulation data describing one or more regulations that may apply depending on the vehicle's location;
collect actual vehicle readings;
compare the actual vehicle readings to stored regulation data corresponding to the vehicle's location to determine whether the vehicle is compliant with the one ore more regulations; and
if the vehicle is non-compliant, modify the configuration of the vehicle to comply with the one or more regulations.

9. The apparatus as recited in claim 8, further including a network interface for communicating with a remote device using IP-based protocols and wherein to store a set of regulation data describing one or more regulations includes obtaining the regulation data from the remote device.

10. The apparatus as recited in claim 8, wherein to modify the configuration of the vehicle to comply with the one or more regulations includes performing at least one modification from the group of deploying a lift axle, reducing the vehicle speed, activation headlamps, and changing engine emission settings.

11. The apparatus as recited in claim 8, further configured to determine whether the vehicle's configuration is in an overly compliant state, and wherein if the vehicle is in the overly compliant state to modify the configuration of the vehicle to transition the vehicle to a compliant state.

12. The apparatus as recited in claim 11, wherein to transition the vehicle to the compliant state includes performing at least one modification from the group of retracting a lift axle and changing engine emission settings.

13. A system having computer executable components for managing the configuration of a vehicle, the system comprising:
a data collection component operative to collect data that describes vehicle conditions from a plurality of sources;
a storage component that stores a set of regulation data describing one or more regulations that vary between locations;
a positioning component for identifying a location of the vehicle using a SPS positioning system;
a configuration component operative to modify the configuration of the vehicle to prevent a violation if a determination is made that the configuration of the vehicle should be modified to comply with the one ore more regulations.

14. The system as recited in claim 13, wherein the storage component stores regulation data associated with a plurality of jurisdictions including at least one regulation from the group of a weigh limit restriction, an emission idle standard, and a headlamp lighting regulation.

15. The system as recited in claim 13, wherein the storage component stores route data that includes speed limits for a plurality of roadways.

16. The system as recited in claim 13, wherein the storage component stores configuration data describing configuration settings of vehicle components that are needed to comply with each of the one or more regulations.

17. The system as recited in claim 13, wherein to modify the configuration of the vehicle to prevent a violation includes performing at least one modification from the group of deploying a lift axle, reducing the vehicle speed, activation headlamps, and changing engine emissions settings.

18. The system as recited in claim 13, wherein to modify the configurations of the vehicle to prevent a violation includes transmitting a message to a corresponding vehicle controller that is responsible for implementing the modification.

* * * * *

UNITED STATES PATENT AND TRADEMARK OFFICE
CERTIFICATE OF CORRECTION

PATENT NO. : 8,364,399 B2  
APPLICATION NO. : 12/774502  
DATED : January 29, 2013  
INVENTOR(S) : M. Wendling et al.

It is certified that error appears in the above-identified patent and that said Letters Patent is hereby corrected as shown below:

In the Claims:

| COLUMN | LINE | ERROR |
|---|---|---|
| 11 (Claim 8) | 19 | "ore" should read --or-- |
| 12 (Claim 13) | 16 | "ore" should read --or-- |
| 12 (Claim 14) | 21 | "weigh" should read --weight-- |

Signed and Sealed this  
Seventeenth Day of September, 2013

Teresa Stanek Rea  
*Deputy Director of the United States Patent and Trademark Office*